United States Patent
Pospichal et al.

(10) Patent No.: US 7,771,883 B2
(45) Date of Patent: Aug. 10, 2010

(54) VIRTUAL COMPRESSOR OPERATIONAL PARAMETER MEASUREMENT AND SURGE DETECTION IN A FUEL CELL SYSTEM

(75) Inventors: Peter Pospichal, Rochester, NY (US); Joseph D. Rainville, Caledonia, NY (US)

(73) Assignee: GM Global Technology Operations, Inc., Detroit, MI (US)

(*) Notice: Subject to any disclaimer, the term of this patent is extended or adjusted under 35 U.S.C. 154(b) by 1870 days.

(21) Appl. No.: 10/765,815

(22) Filed: Jan. 27, 2004

(65) Prior Publication Data

US 2005/0164057 A1 Jul. 28, 2005

(51) Int. Cl.
*H01M 8/04* (2006.01)
(52) U.S. Cl. .................. 429/444; 429/408; 429/427; 429/428; 429/443
(58) Field of Classification Search .................. None
See application file for complete search history.

(56) References Cited

U.S. PATENT DOCUMENTS

2002/0039672 A1* 4/2002 Aramaki ............... 429/22

2002/0150805 A1* 10/2002 Stenersen et al. ......... 429/34

FOREIGN PATENT DOCUMENTS

JP 60-160574 * 8/1985

* cited by examiner

Primary Examiner—Jonathan Crepeau
Assistant Examiner—Tony Chuo
(74) Attorney, Agent, or Firm—John A. MIller; Miller IP Group, PLC

(57) ABSTRACT

A fuel cell system that employs surge prevention by electronically mapping the compressor for discharge pressure versus mass airflow. In one embodiment, the fuel cell system employs a mass flow meter that measures the airflow to the compressor. A controller receives a signal from the mass flow meter indicative of the flow rate of the charge airflow to the compressor, and determines the outlet pressure and temperature of the compressor from the compressor speed and the measured airflow. This gives the compressor map location at which the compressor is operating. In another embodiment, the fuel cell system employs a pressure sensor that measures the output pressure of the compressor, and provides a pressure signal to the controller. The controller determines the mass airflow to the compressor to determine the compressor map location.

14 Claims, 2 Drawing Sheets

VIRTUAL COMPRESSOR OPERATIONAL PARAMETER MEASUREMENT AND SURGE DETECTION IN A FUEL CELL SYSTEM

BACKGROUND OF THE INVENTION

1. Field of the Invention

This invention relates generally to an air delivery sub-system for a fuel cell system and, more particularly, to an air delivery sub-system for a fuel cell system, where the air delivery sub-system uses a compressor map to control the compressor speed to prevent the compressor from approaching a surge condition.

2. Discussion of the Related Art

Hydrogen is a very attractive fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines.

A hydrogen fuel cell is an electro-chemical device that includes an anode and a cathode with an electrolyte therebetween. The anode receives hydrogen gas and the cathode receives oxygen or air. The hydrogen gas is disassociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode. The work acts to operate the vehicle.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The combination of the anode, cathode and membrane define a membrane electrode assembly (MEA). MEAs are relatively expensive to manufacture and require certain conditions for effective operation. These conditions include proper water management and humidification, and control of catalyst poisoning constituents, such as carbon monoxide (CO).

Many fuel cells are typically combined in a fuel cell stack to generate the desired power. The fuel cell stack receives a cathode charge gas that includes oxygen, and is typically a flow of forced air from a compressor. Not all of the oxygen in the air is consumed by the stack and some of the air is output as a cathode exhaust gas that may include water as a stack by-product. The fuel cell stack also receives a hydrogen anode input gas that is combined with the charge air to generate the power, as discussed above.

It is known in the art to employ a turbo-machine type compressor, such as a centrifugal, radial, axial, mixed flow, etc., compressor, in a fuel cell system. These types of compressors are low cost and low weight, and operate with low noise as compared with the positive displacement compressors, such as twin-screw compressors, that are also sometimes employed in fuel cell systems.

It is necessary that the compressor operate on its compressor map of pressure ratio (outlet pressure/inlet pressure) versus airflow. FIG. 1 is a graph with mass flow on the horizontal axis and discharge pressure on the vertical axis showing a typical example of a compressor map 50 for a turbo-machine type compressor. The compressor map 50 includes a series of speed lines 52 that show the relationship between airflow through the compressor and the discharge pressure of the compressor at various compressor speeds. Every compressor can be mapped in this manner. The compressor map 50 is bound by a surge line 54 at which the compressor suffers from an audible flow reversion caused by excessive back-pressure. This back-pressure is generally caused by the pressure drop across the stack and a back pressure valve at the cathode exhaust of the fuel cell stack that is used to control stack humidity. In other words, excessive back-pressure from the fuel cell system could cause a compressor surge condition. This surging point or reverse flow of air through the compressor is determined by the speed or RPM of the compressor, the system back-pressure, the altitude and the temperature. The map of the pressure ratio is also bound by a choke line 56 where the maximum airflow is reached with minimal pressure for a given compressor speed.

The compressor cannot operate at relatively high pressure ratios that put the compressor into a surge condition because of severe oscillation of the airflow through the compressor that could damage the compressor. Therefore, a fuel cell system that employs a turbo-machine type compressor requires surge detection and protection that detects a reverse airflow through the compressor to prevent compressor surge. Positive displacement compressors do not surge with excessive back-pressure. Therefore, a reverse airflow through the known positive displacement compressors does not present a problem or cause compressor damage, and thus, surge detection is typically not required on fuel cell systems that employ these types of compressors.

SUMMARY OF THE INVENTION

In accordance with the teachings of the present invention, a fuel cell system is disclosed that employs a centrifugal compressor that delivers charge air to the cathode side of a fuel cell stack. The fuel cell system employs compressor surge prevention by electronically mapping the compressor for discharge pressure versus mass airflow. A controller of the fuel cell system determines the map location where the compressor is operating relative to a compressor surge line.

In one embodiment, the fuel cell system employs a mass flow meter that measures the airflow to the compressor. The controller receives a signal from the mass flow meter indicative of the flow rate of the charge airflow to the compressor. The controller determines the outlet pressure and temperature of the compressor from the actual compressor speed and the measured airflow. This information allows the controller to electronically derive the compressor map location at which the compressor is currently operating. If the operational parameters of the compressor are approaching a surge condition based on the derived map location, the controller can take suitable action, such as lowering system back pressure, or increasing compressor speed to remove the surge condition.

In another embodiment, the fuel cell system employs a pressure sensor that measures the output pressure of the compressor, and provides a pressure signal to the controller. The controller determines the mass airflow to the compressor by the pressure signal and the actual compressor speed. This information allows the controller to electronically derive the compressor map location at which the compressor is currently operating. If the operational parameters of the compressor are approaching a surge condition based on the derived map location, the controller can take suitable action, as discussed above.

Additional advantages and features of the present invention will become apparent from the following description and appended claims, taken in conjunction with the accompanying drawings.

DETAILED DESCRIPTION OF THE INVENTION

The following description of the embodiments of the invention directed to a fuel cell system employing a technique for preventing a compressor surge condition is merely exemplary in nature, and is in no way intended to limit the invention or its applications or uses.

Figure 2:
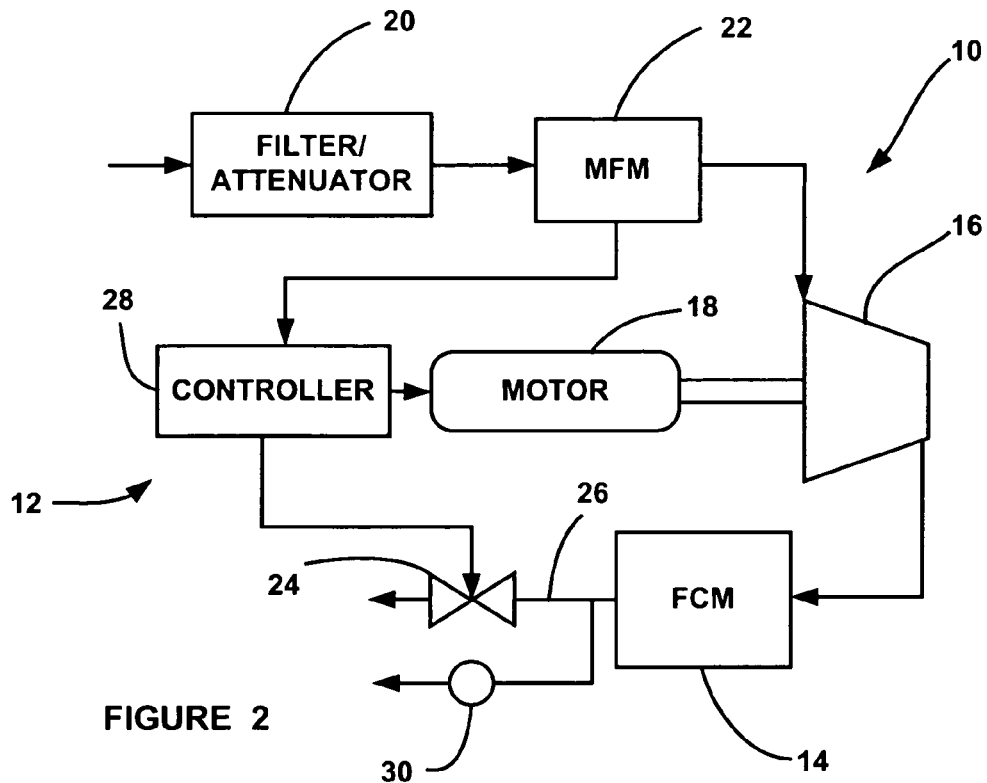
FIG. 2 is a plan view of a fuel cell system that provides compressor surge detection by measuring the compressor speed and the airflow rate to compressor to determine the outlet pressure and temperature of the compressor and to derive the compressor map location at which the compressor is currently operating, according to an embodiment of the present invention.

FIG. 2 is a plan view of a fuel cell system 10 including an air delivery sub-system 12 and a fuel cell module (FCM) 14 having a fuel cell stack of the type discussed above. The fuel cell system 10 can be used for any suitable application, such as on a vehicle or a distributed generation power system.

The sub-system 12 includes a turbo-machine compressor 16 that provides charge air to the cathode side of the FCM 14. The compressor 16 can be any suitable turbo-machine type compressor, such as a centrifugal, radial, axial, mixed flow, etc., compressor. This type of compressor is desirable in the system 10 because it is low cost and low weight, and operates with low noise as compared to the positive displacement compressors, such as twin-screw compressors, that are currently employed in fuel cell systems. The hydrogen fuel input to the FCM 14 is not shown in this diagram. Cathode exhaust, including unused air and water, is emitted from the FCM 14 through a cathode exhaust line 26. The orientation of a back pressure valve 24 in the cathode exhaust line 26 is controlled to control the pressure within the FCM 14, and thus, control stack pressure, membrane humidity, etc, as is well understood in the art. A by-pass valve 30 is positioned in parallel with the backpressure valve 24 in the cathode exhaust line 26, and can be opened to completely eliminate the output pressure of the cathode exhaust.

A motor 18 drives the compressor 16 at the appropriate speed to provide the desired amount of charge air to the FCM 14 for the desired output power. Air from the environment is filtered by a filter/attenuator 20 that also reduces compressor whine. The filtered air is sent through a mass flow meter (MFM) 22 that measures the airflow through the compressor 16. A signal indicative of the airflow through the compressor 16 from the MFM 22 is sent to a controller 28. The controller 28 controls the speed of the motor 18 to control the airflow through the compressor 16 to provide the proper air stoichiometry or lambda for the desired output power of the FCM 14.

The controller 28 also controls the orientation of the back pressure valve 24 to control the pressure within the FCM 14, and thus, membrane humidity. The controller 28 can also open and close the by-pass valve 30. Many factors determine the speed of the compressor 16, including desired output power, ambient temperature, altitude, etc.

Figure 1:
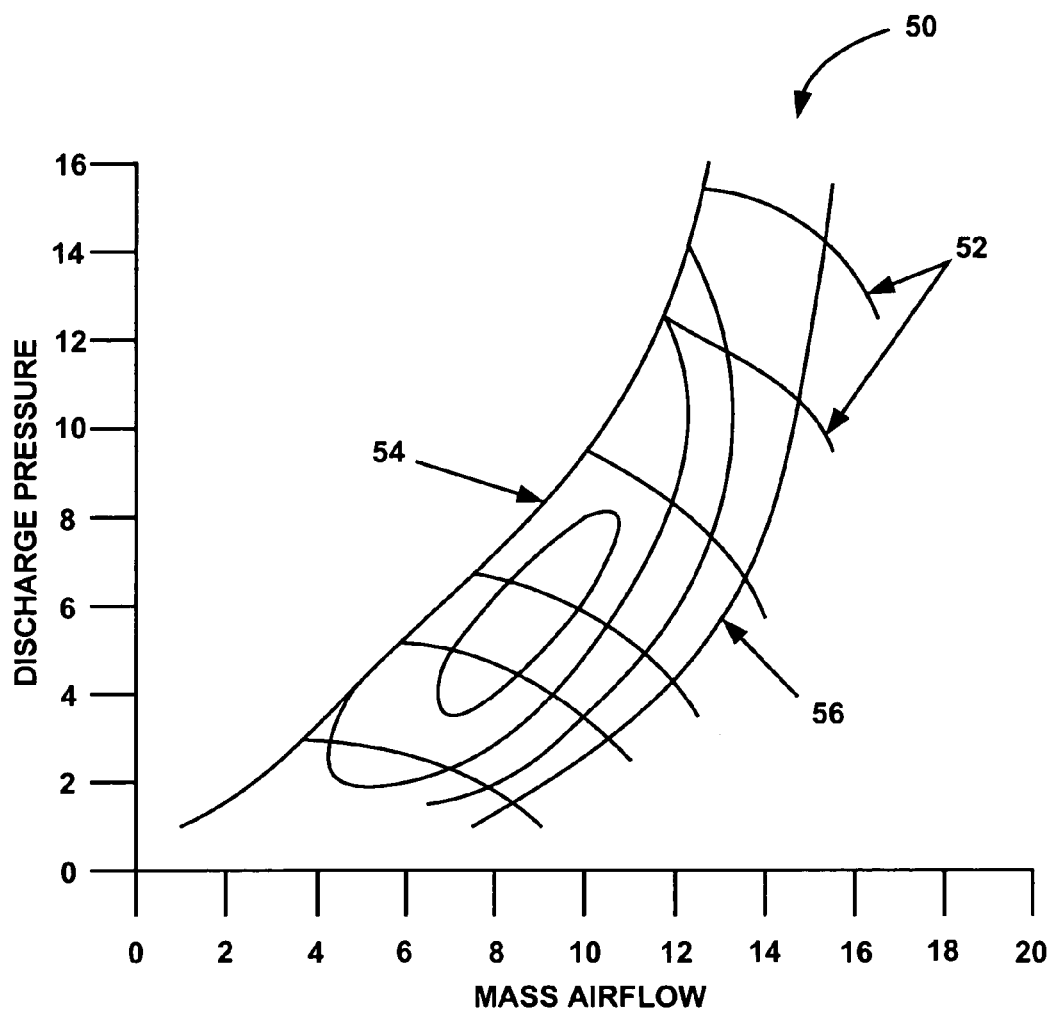
FIG. 1 is a graph with mass airflow on the horizontal axis and discharge pressure on the vertical axis showing a typical compressor map.

According to the invention, the system 10 detects a potential compressor surge condition by storing and using a compressor map for the compressor 16 of the type shown in FIG. 1 in an electronic format in the controller 28. The controller 28 determines the discharge pressure and temperature of the compressor 16 from the actual compressor speed provided by the motor 18 and the measured airflow from the MFM 22. The temperature of the discharge air from the compressor 16 is used to provide a correction for airflow density. From this information, the controller 28 derives the map location at which the compressor 16 is currently operating. If the operational parameters of the compressor 16 are approaching the surge condition, line 54, the controller 28 can take the appropriate action, such as lowering system back pressure by opening the valve 24 or increasing compressor speed by the motor 18 to remove the compressor 16 from the potential surge condition. Further, the controller 30 can open the by-pass valve 30 in the exhaust line 26 so that the pressure at the output of the compressor 16 is reduced to eliminate the surge condition.

Figure 3:
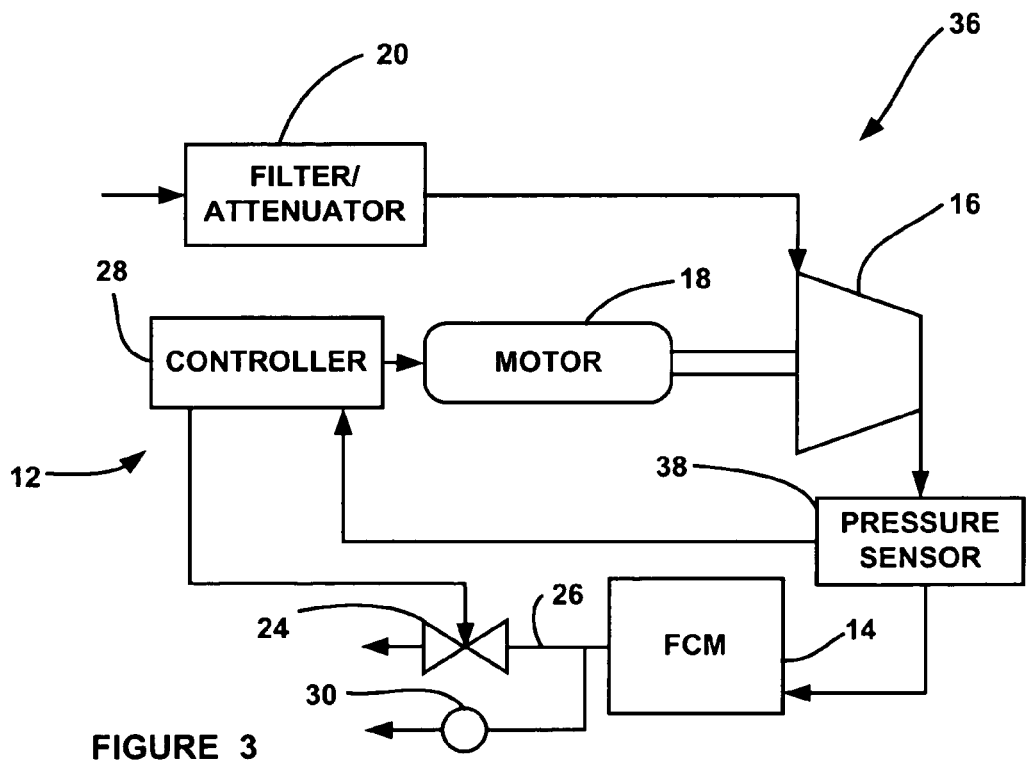
FIG. 3 is a plan view of a fuel cell system that provides compressor surge detection by measuring the compressor speed and the output pressure of the compressor to determine the mass airflow rate to the compressor and to derive the compressor map location at which the compressor is currently operating, according to another embodiment of the present invention.

FIG. 3 is a plan view of a fuel cell system 36 similar to the fuel cell system 10, where like reference numerals identify the same elements. In the system 36, the MFM 22 has been eliminated, and a pressure sensor 38 is provided in the output line of the compressor 16 between the compressor 16 and the FCM 14. The pressure sensor 38 measures the discharge pressure of the compressor 16 and provides a pressure signal to the controller 28. The controller 28 stores the electronic compressor map of the compressor 16. The controller 28 determines the mass airflow to the compressor 16 from the pressure signal and the actual compressor speed provided by the motor 18. From this information, the controller 28 derives the map location at which the compressor 16 is currently operating. If the operational parameters of the compressor 16 are approaching the potential surge condition, the controller 28 can take the appropriate action, as discussed above.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
   a fuel cell module including a cathode input responsive to a charge airflow and a cathode exhaust;
   a compressor generating the airflow applied to the cathode input of the fuel cell module;
   a mass flow meter responsive to the airflow sent to the compressor, and generating a signal indicative of the speed of the airflow through the compressor;
   a motor for driving the compressor; and
   a controller responsive to the signal from the mass flow meter, said controller providing a signal to the motor to control the speed of the compressor, said controller storing a compressor map of the compressor, said controller determining the discharge pressure and temperature of the compressor from the speed of the compressor and the airflow signal from the mass flow meter, said controller further determining the location on the compressor map at which the system is operating and preventing the compressor from entering a surge condition.

2. The system according to claim 1 wherein the compressor is a turbo-machine compressor.

3. The system according to claim 2 wherein the compressor is selected from the group consisting of centrifugal, radial, axial and mixed flow compressors.

4. The system according to claim 1 further comprising a back pressure valve positioned in the cathode exhaust, said back pressure valve controlling the pressure in the fuel cell module, said controller controlling the orientation of the back pressure valve to prevent the surge condition.

5. The system according to claim 1 further comprising a by-pass valve in the cathode exhaust, said controller controlling the by-pass valve to prevent the surge condition.

6. The system according to claim 1 wherein the fuel cell is on a vehicle or a distributed generation power system.

7. A fuel cell system comprising:
- a fuel cell module including a cathode input responsive to a charge air flow and a cathode exhaust;
- a compressor generating the airflow applied to the cathode input of the fuel cell module;
- a motor that drives the compressor; and
- a controller providing a signal to the motor to control the speed of the compressor, said controller storing a compressor map of the compressor, said controller using the compressor map and the speed of the compressor to determine the location on the compressor map that the compressor is operating and prevent the compressor from entering a surge condition.

8. The system according to claim 7 wherein the controller determines the discharge pressure and temperature of the compressor from the speed of the compressor and an airflow through the compressor.

9. The system according to claim 7 wherein the controller determines the airflow rate to the compressor based on a discharge pressure of the compressor.

10. The system according to claim 7 wherein the compressor is a turbo-machine compressor.

11. The system according to claim 7 further comprising a back pressure valve positioned in the cathode exhaust, said back pressure valve controlling the pressure in the fuel cell module, said controller controlling the orientation of the back pressure valve to prevent the surge condition.

12. A method for preventing a surge condition of a compressor in a fuel cell system, said method comprising:
- storing a compressor map of the compressor;
- driving the compressor at a desirable speed; and
- using the compressor map and the speed of the compressor to determine the location on the compressor map that the compressor is operating and prevent the compressor from entering the surge condition.

13. The method according to claim 12 further comprising measuring the airflow to the compressor and using the compressor map to determine the discharge pressure and temperature of the compressor from the speed of the compressor and the airflow.

14. The method according to claim 12 further comprising measuring the pressure of the discharge airflow from the compressor and using the compressor map to determine the airflow rate to the compressor from the pressure and the speed of the compressor.

* * * * *